April 5, 1966 G. GRUNAU ET AL 3,244,191
REVERSIBLE VALVE ACTUATOR
Filed Sept. 30, 1964 4 Sheets-Sheet 1
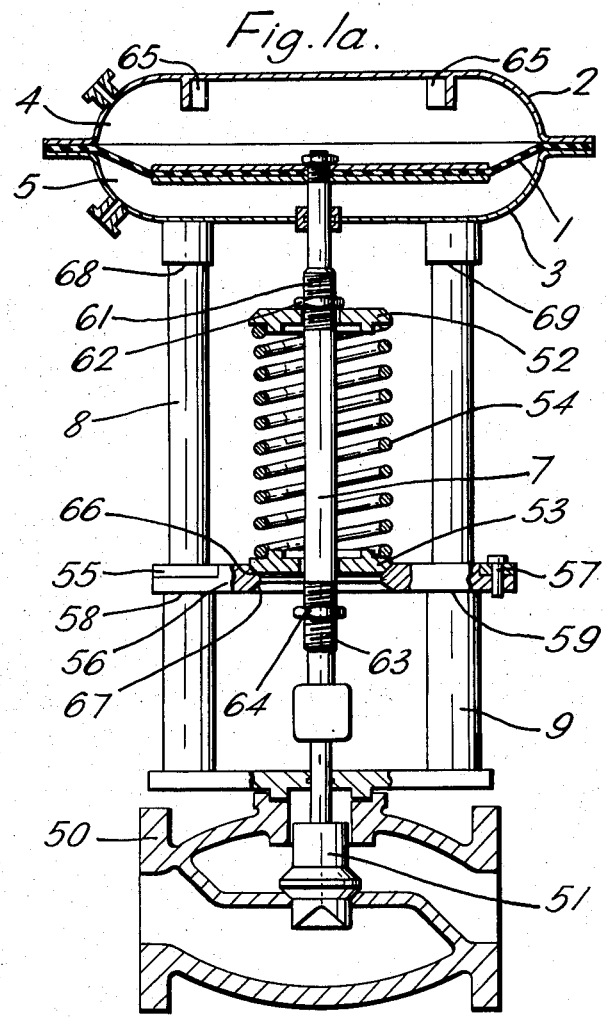
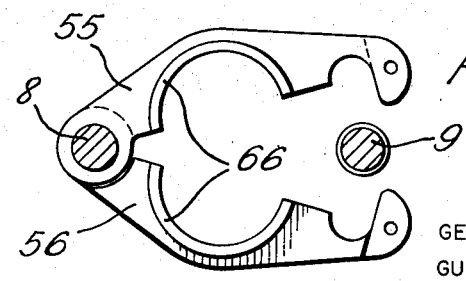
INVENTORS.
GERHARD GRUNAU
GUNTER PAHL and
JOACHIM CZARDYBON
BY *Arthur H. Swanson*
ATTORNEY INVENTORS.
GERHARD GRUNAU
GUNTER PAHL and
JOACHIM CZARDYBON
BY
*Arthur H. Swanson*
ATTORNEY INVENTORS.
GERHARD GRUNAU
GUNTER PAHL and
JOACHIM CZARDYBON

BY

*Arthur H. Swenson*

ATTORNEY

April 5, 1966    G. GRUNAU ET AL    3,244,191
REVERSIBLE VALVE ACTUATOR
Filed Sept. 30, 1964    4 Sheets-Sheet 4
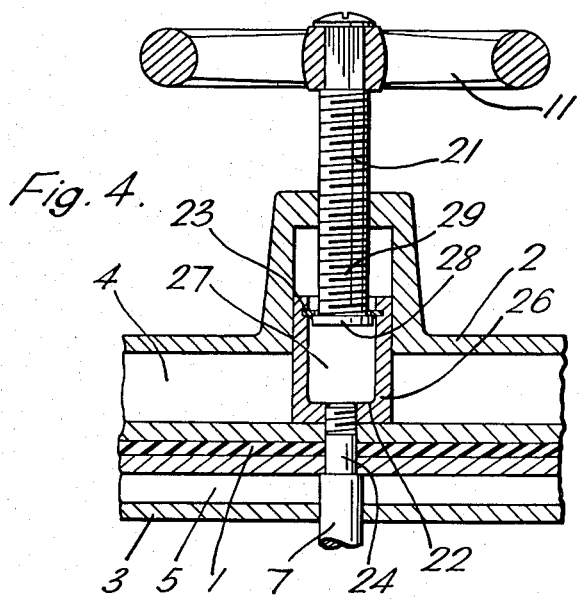
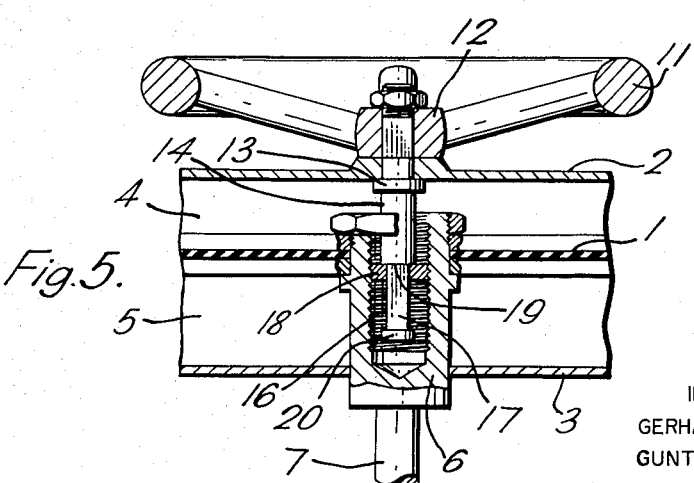
INVENTORS.
GERHARD GRUNAU
GUNTER PAHL and
JOACHIM CZARDYBON
BY
ATTORNEY

United States Patent Office 3,244,191
Patented Apr. 5, 1966

3,244,191
REVERSIBLE VALVE ACTUATOR
Gerhard Grunau, Offenbach (Main), Gunter Pahl, Dornigheim (Main), and Joachim Czardybon, Wetzlar, Germany, assignors to Honeywell Gesellschaft mit beschränkter Haftung, Frankfurt am Main, Germany, a corporation of Germany
Filed Sept. 30, 1964, Ser. No. 400,461
16 Claims. (Cl. 137—271)

The present invention relates to actuators for fluid flow control valves hereinafter referred to as valve actuators and to combinations of valves and valve actuators.

It is often desirable to provide reversible valve actuators which can be set up in two ways so that the same manner of variation of an actuating signal applied to an actuator causes operation of a valve coupled to it in opposite senses depending on which way the actuator is set up. For example, where the actuating signal is a pneumatic one, it may be required to provide an actuator which can be set up so that, as the signal (i.e., the pressure) increases, a simple plug valve to which the actuator is coupled, is moved either from its closed towards its open position or from its open towards its closed position. Where the actuator includes one or more springs acting in opposition to the actuating force, it will be appreciated that this requirement necessitates a change in the direction in which the spring force acts.

It is an object of the present invention to provide an improved reversible valve actuator of the kind including one or more springs acting in opposition to the actuating force.

According to the present invention, a reversible valve actuator comprises a stem for coupling to a movable valve member and a supporting structure for mounting the actuator relative to a valve body, the stem being connected within the actuator to be moved axially in either sense in response to an applied signal and the actuator further including a spring to provide a force acting in opposition to motion of the stem in a selected sense, a pair of stops mounted on the stem at points spaced apart along its length, a pair of end members at opposite ends of the spring which end members are mounted on the stem between the stops so as to be able to slide along its length but are adapted to engage the stops thereby limiting the possible extent of movement relative to the stem, and a further stop adapted to be secured in position on the supporting structure and, when so secured, to be capable of engaging the end members, the arrangement being such that, with the further stop positioned between either of the pairs of stops (the particular one being selected according to the selected sense of action of said force) and the nearer end member, the spring is held under compression between the other of the pair of stops and the further stop.

The present invention also provides in combination a valve and a valve actuator as defined in the previous paragraph, the stem of the actuator being coupled to the moving parts of the valve and the supporting structure being mounted on the valve body.

Examples of actuators according to the present invention will now be described with reference to the accompanying drawings in which:

FIG. 1a shows a cross section of one actuator together with a simple plug valve, the actuator being set up for operation in one mode;

FIG. 1b shows a part of the actuator of FIG. 1a;

Figure 2:
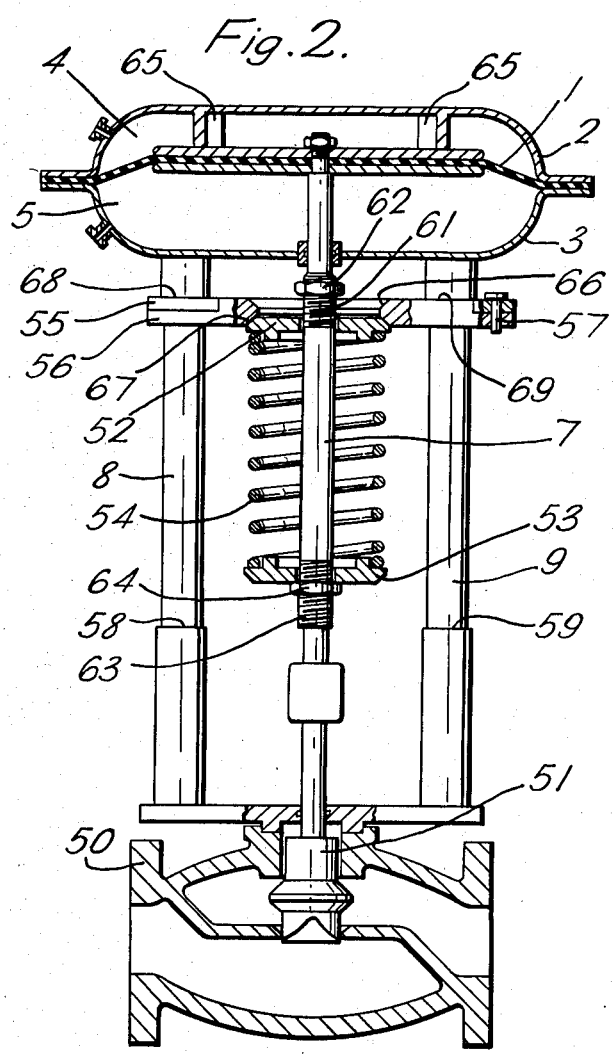
FIG. 2 is similar to FIG. 1a except that the actuator is set up for operation in the opposite mode.

Referring first to FIGS. 1a and 1b, the actuator is diaphragm-operated and includes in conventional manner a diaphragm 1 effectively dividing a diaphragm chamber formed by the two casing parts 2 and 3 into upper and lower chambers 4 and 5. The terms upper and lower and similar terms are used here and elsewhere in this specification solely with reference to positions or directions shown in the drawings and their use does not imply that the actuators or valves are necessarily always used in the positions shown. The diaphragm 1 is rigidly connected to a stem 7 so that the latter is moved axially in response to changes in the position of the diaphragm. A supporting structure including the longitudinal supports 8 and 9 is provided to support the actuator on a valve body. By way of example, FIG. 1 shows the actuator mounted on the body of a simple plug valve 50 having a valve member 51 which is attached to the lower end of the actuator stem 7 to be moved by it.

As shown in FIG. 1a, the actuator is set up for operation in the mode requiring the application of an increasing pressure (i.e., an increasing pneumatic signal) to the upper chamber to close the valve 50 and is shown as it would be with the necessary pressure applied and the valve member 51 seated to close the valve 50. It will be understood that the same effect could be achieved by reducing the pressure in the lower chamber 5 relative to that in the chamber 4 and that it is an effective increase in the pressure in the upper chamber 4 relative to that in the lower chamber 5 which is required to close the valve 50. According to circumstances, one of the chambers 4 and 5 may be at a fixed pressure, the pressure in the other varying to operate the valve, or both chambers may be at varying pressures.

Mounted on the stem 7 to slide relative to it are the end plates 52 and 53 of a helical spring 54 which, in the presently considered mode of operation, is required to provide a force opposing downwards motion of the stem 7. The lower plate 53 is seated on a stop formed by a clamp formed by the two jaws 55 and 56 (see FIG. 1b). The clamp is mounted on the support 8 and can either be opened, as in FIG. 1b, to clear other parts of the actuator when being moved along the support 8, or closed when the jaws 55 and 56 close round the other support 9. The jaws 55 and 56 can be held closed, as shown in FIG. 1a, by a bolt 57 or similar fixing device. For the mode of operation being described, the clamp is positioned against shoulders 58 and 59 on the supports 8 and 9. The end plate 53 seats against the self-centering seating 66 on the upper surfaces of the jaws 55 and 56. A similar seating 67 (see below) is provided on the lower surfaces of the jaws 55 and 56.

The upper end plate 52 is held against a stop in the form of a nut 62 screwed on to a threaded portion 61 of the actuator stem 7. This is one of a pair of stops carried by the stem 7 and spaced apart along its length, the other being constituted by the nut 64 screwed on to the threaded portion 63 of the stem 7. This latter stop is not employed in the present mode of operation.

It will be evident that, as described, the spring 54 which is under compression between the end plate 52 and the fixed stop formed by the clamp 55, 56 will exert the required force opposing downwards motion of the stem 7. Further, the magnitude of this force can be adjusted by altering the position of the nut 62 along the threaded portion 61 of the stem 7.

If the opposite mode of operation is required in which the valve 50 is opened against the action of the spring 54 by effectively increasing the pressure in the lower chamber 5, the clamp 55, 56 is repositioned on the supports 8 and 9, against the shoulders 68 and 69, as shown in FIG. 2, so that it lies between the nut 62 and the upper end plate 52. The lower end plate 53 now seats against the nut 64, i.e. the lower one of the pair of stops on the actuator stem 7, and the upper end plate 52 seats against the seat 67 on the underside of the clamp 55, 56. The spring 54, being again under compression, acts against upwards movement of the stem 7. The force can be adjusted by screwing the nut 64 along the threaded portion 63 of the stem 7.

It will thus be seen that by positioning the fixed stop formed by the clamp 55, 56 between one or other of the pair of stops formed by the nuts 62 tnd 64 and the nearer end plates 52 and 53 respectively, the actuator can be set up to operate in either mode as required with the spring opposing either downwards or upwards motion of the stem 7.

Stops 65 are provided on the casing part 2 to limit the upward motion of the actuator stem 7 and therefore to prevent damage to the valve 50 by moving the valve member 51 too far away from its seat.

Figure 3:
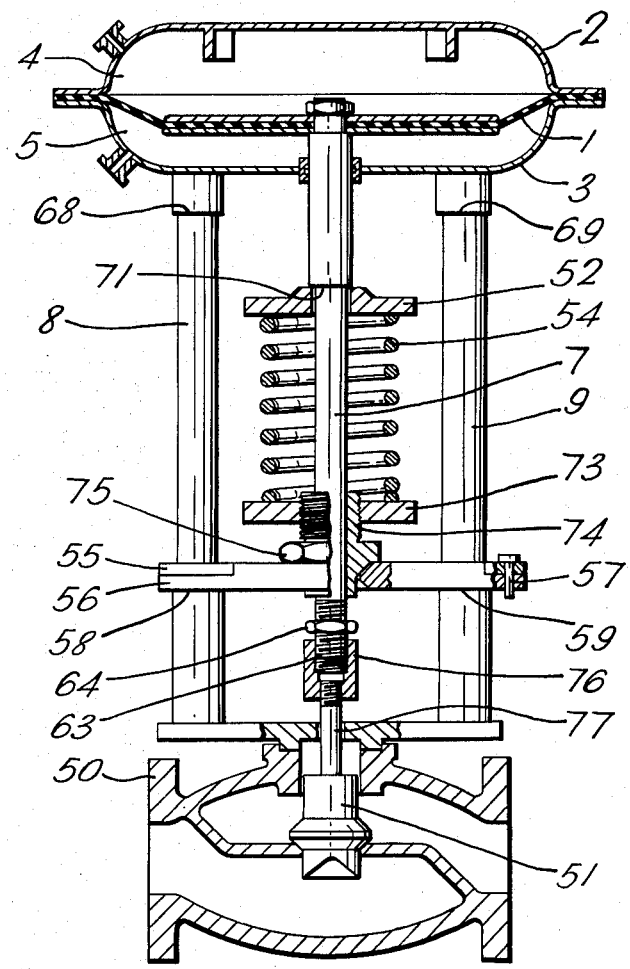
FIG. 3 shows a cross section of a second actuator together with a simple plug valve; and, FIGS. 4 and 5 show cross sections of two manually-operable drive mechanisms for use with the actuators of FIGS. 1–3.

FIG. 3 shows a modified form of actuator. Many parts of the actuator and valve shown in FIG. 3 are the same as those described with reference to FIGS. 1 and 2. They have been given the same references and will not be described in detail. The actuator is shown set up for operation with spring 54 opposing downwards motion of the stem, i.e. closing of the valve 50 by effectively increasing the pressure in the upper chamber 4. In this actuator, the upper of the pair of stops on the stem 7 is simply a shoulder 71. To permit adjustment of the compression of the spring 54 the lower end plate 73 is screwed on to a bushing 74. This is seated on the fixed stop formed by the clamp 55, 56 or, in the other mode (not shown) seats against the lower of the pair of stops formed as before by the nut 64. The seat provided for bushing 75 by the clamp is similar to, but rather smaller than that in FIG. 1b. For this reason the end plate 52 has a bushing on its upper surface shaped to enable it to engage the same seat. The bushing 74 has a nut 75 formed integrally with it to facilitate its rotation and the consequent adjustment of the position of the end plate 73 and the compression of the spring.

A further minor modification shown is that the thread 63 is employed additionally in the coupling between the stem 7 of the actuator and the stem 77 of the valve 50. This coupling consists simply of a bushing 76 having two separate internal threads into which the thread 63 and a thread on the upper end of the stem 77 are screwed. The relative positions of the two stems are thus adjustable within the limits imposed by the lengths of the threads.

In both of the actuators described above, a bellows or the like, for example of synthetic plastic material, may be fixed to the end plates 52 and 53 to surround and thus protect the spring 54.

In many cases it is desirable to make provision for manual operation of the valve, for example in case of failure of the actuating signals. Examples of suitable devices are shown in FIG. 4 and 5. Referring first to FIG. 4 which shows the central portion only of the elements 1–5 of the actuators shown in FIGS. 1–3 together with the upper end of the stem 7, a handwheel 11 is mounted on a screw threaded shaft 21 which is threaded into a thread provided on the internal surface of an opening provided in the upper casing part 2, coaxial with the stem 7. The spindle 21 has a flange 28 on its lower end and a bushing 26 which is screwed on to the upper end 24 of the stem 7 above the diaphragm 1, has an internal flange 23 formed for example by a snap ring. The spindle 21 projects into the space 27 within the bushing 26, the flange 28 being located below the flange 23 and their dimensions being such that the former engages the latter when being withdrawn upwards out of the space 27. The spacing between the snap ring 23 and the bottom inner surface 22 of the bushing 26 is made equal to the permissible travel of the member, e.g. the valve member 51 in FIGS. 1–3, which is to be operated by the actuator while the length of the thread on the spindle 21 must be at least double the permissible travel.

In the mode of operation in which the stem 7 is moved upwards against a spring force by an increasing control pressure applied to the lower chamber 5 to open the attached valve, the position shown in FIG. 4 would occur while the valve is held closed under the action of the spring and the control pressure is at its minimum value. Increasing the control pressure to open the valve will lift the stem 7 and, with it, the bushing 26 until the surface 22 of the bushing comes into contact with the underside of the flange 28. This prevents any further movement of the stem 7 and any damage to the valve or the diaphragm due to excessive travel. If the control pressure fails, the stem will return to the position shown in FIG. 4 and can be lifted to operate the valve by manually screwing the spindle 21 so that it moves upwards. Since the flange 28 is in engagement with the snap-ring 23, the stem 7 will move upwards as well, thus opening the valve.

In the other mode of action in which the spindle 7 is moved downwards against a spring force by an increasing control pressure applied to the upper chamber 4 to close an attached valve, the positions shown will occur when the valve is being held closed by the full control pressure. In the event of failure of the pressure, the spring will move the surface 22 up into contact with the flange 28. Screwing the spindle downwards will then move the stem 7 downwards, allowing the valve to be closed by manual operation.

Various modifications of this manual drive are possible. For example, the stem 7 may carry the flange and the spindle 21 the bushing and snap-ring. Again the spindle 21 could be hollow and extend down around a collar on the upper end of the stem 7.

In the manual drive device shown in FIG. 5, the use of a rising spindle, as in the device of FIG. 4, is avoided. Here the spindle 14 is supported relative to the casing part 2 by the boss 12 of the handwheel 11 and a collar 13 so that it is free to rotate but is fixed axially. The upper end of the stem 7 carries a bushing 6 having an axial internally threaded cavity 16 in its upper end. The lower end of the spindle 14 carries a collar 20 while the part 17 lying between the collar 20 and a shoulder 19 is of square or hexagonal section. The part 17 passes through a hole of the same cross-section in a nut 18 having an external screw thread which engages the internal thread of the cavity 16. The nut 18 can move axially with respect to the part 17, but cannot rotate relative to it.

From this description, it will be seen that, in the mode of operation where an increasing control pressure in the upper chamber 4 closes an attached valve against the action of a spring, the positions shown in FIG. 5 will occur when the control pressure is at its minimum value, the spring force holding the spindle 7 up so that the nut 18 is seated against the shoulder 19. In this condition, should it be required to close the valve manually, rotation of the handwheel 11 in the appropriate sense will cause the part 17 and the nut 18 to rotate. This, through the action of the threads on the nut 18 and inside the cavity 16, will in turn cause the stem 7 to move downwards closing the valve. In normal operation in this mode, on increasing the control pressure, the nut 18 can slide down the part 17 until it comes up against the collar 20. The length of the part 17 is made equal to the maximum permissable travel of the valve member so that the collar 20 acts as a stop preventing over-travel. Should the control pressure fail while the valve is being held closed, the spring force would immediately return the stem 7 to the position shown in FIG. 5 and, thereafter, operation of the handwheel 11 as described above can be employed to close it again.

In the other mode of operation, with increasing control pressure applied to the lower chamber 5 to open the valve which is normally held closed by the spring force, the positions shown in FIG. 5 will occur when full control pressure is being applied and the valve is open. The shoulder 19 now acts as a stop preventing excessive travel under the action of the control pressure. If the control pressure fails, or is removed, the spring force acting downwards will cause the stem 7 to move downwards until the nut 18 which slides on the part 17, comes up against the stop constituted by the collar 20. In the event of control pressure failure, the valve can be opened manually by rotating the handwheel 11 in the appropriate sense (which will be opposite to that required in the first mode of operation). This will cause the nut 18 to rotate and the stem 7 to be raised through the action of the threads on the nut 18 and the inside of the cavity 16.

The length of the thread inside the cavity 16 must be about twice the permitted length of travel of the valve member to enable the manual adjusting device to operate the valve through its full travel in both modes.

Here again, the device may be modified by providing a cavity in the lower end of the spindle having a square or hexagonal cross-section engaging the exterior of a nut having an internal thread engaging a thread on an external surface of the actuator stem or an extension thereof.

While the actuators described have been pneumatically operated diaphragm type actuators, it will be appreciated that the present invention applies equally to other types of pneumatically driven actuators, and other types of actuators such as mechanically or electrically driven actuators in which there is a stem which can be driven axially in either sense in response to an applied control signal. Additionally simple open/shut plug valves have been described whereas actuators according to the invention may be employed with any desired type of valve. The term valve is here used broadly to include all types of fluid (liquid or gas) flow control devices whether commonly known as valves or not, for example dampers and flaps for controlling the flow of fluid in a conduit.

What is claimed is:

1. A reversible valve actuator comprising a stem for coupling to a movable valve member and a supporting structure for mounting the actuator relative to a valve body, the stem being connected to the actuator to be moved axially in either sense in response to an applied signal and the actuator further comprising a spring to provide a force acting in opposition to motion of the stem in a selected sense, a pair of stops mounted on the stem at points spaced apart along its length, a pair of end members at opposite ends of the spring which end members are mounted on the stem between the stops so as to be able to slide along its length but are adapted to engage the stops thereby limiting the possible extent of movement relative to the stem, a clamp adapted to be secured in one position on the supporting structure for engaging one of the end members when the actuator is operative to move the stem in one sense and adapted to be secured in another position on the supporting structure for engaging the other of said end members when the actuator is operative to move the stem in an opposite sense.

2. A reversible valve actuator defined in claim 1 wherein the end members are a pair of generally circular end plates against which the two ends of the spring bear.

3. A reversible valve actuator defined in claim 1 wherein one end member has a central hole permitting it to be mounted on and to slide relative to the stem.

4. A reversible valve actuator defined in claim 1 wherein the end members each have a central hole permitting it to be mounted on and to slide relative to the stem.

5. A reversible valve actuator defined in claim 1 wherein one end member has a central hole permitting it to be mounted on and to slide relative to the stem and the other end member having a central internally screw threaded surface in engagement with external screw threads of a bushing that is slidably mounted on the stem.

6. A reversible valve actuator defined in claim 1 wherein one of the pair of stops is an adjustable member mounted on the stem by means of a threaded screw connection.

7. A reversible valve actuator defined in claim 1 wherein each stop is a member mounted on the stem by means of a screw threaded connection.

8. A reversible valve actuator defined in claim 1 wherein one of the pair of stops is an adjustable member mounted on the stem by means of a threaded screw connection and the other of the pair of stops is a fixed shoulder formed on the stem.

9. A reversible valve actuator defined by claim 1 wherein the clamp, when secured in either of said positions, has an opening surrounding the stem.

10. A reversible valve actuator defined by claim 1 wherein the supporting structure is comprised of a pair of strut members running parallel to the stem, and wherein the clamp is mounted on one strut for free slidable movement along the length thereof, and said clamp being operable when closed to form a first aperture that is positioned to the other strut and a second aperture that is positioned to surround the stem.

11. A reversible valve actuator defined by claim 1 wherein a manually operated means is connected to the stem to enable the stem to be moved by manual operation through its operating range.

12. A reversible valve actuator defined by claim 1 wherein a manually operated means is connected to the stem to enable the stem to be moved by manual operation through its operating range, and wherein a spindle is mounted on the actuator coaxially with the stem, the spindle is constructed to move longitudinally in response to rotary manual operation, a coupling is positioned between the spindle and the actuator stem, the coupling comprising a first member having an external flange and projecting axially into a cavity in a second member and stop means spaced axially apart within the cavity for limiting the permissible relative axial movement of the spindle and the stem.

13. A reversible valve actuator defined by claim 1 wherein a manually operated means is connected to the stem to enable the stem to be moved by manual operation through its operating range, and wherein a spindle is mounted on the actuator coaxially with the stem, the spindle is constructed to move longitudinally in response to rotary manual operation, a coupling is positioned between the spindle and the actuator stem, the coupling comprising a first member having an external flange and projecting axially into a cavity in a second member, stop means spaced axially apart within the cavity for limiting the permissible relative axial movement of the spindle and the stem, and said last-mentioned stop means being comprised of the inner end wall of the cavity and a member projecting inwards from the wall of the cavity between the flange and the outer end of the cavity.

14. A reversible valve actuator as defined by claim 1 wherein a spindle is mounted on the actuator coaxially with the stem and connected for non-axial rotatable movement in response to manual rotation applied thereto, a coupling is positioned between the spindle and the actuator stem that is provided with first and intermediate members axially slidable relative to one another within limits defined by stops, an axial screw-threaded connection between the intermediate member and a second member whereby rotation of the first member and intermediate members will cause axial movement of the second member and wherein the first member is a part of the spindle and the second member being part of the stem.

15. A reversible valve actuator as defined by claim 1 in which a spindle is connected for non-axial rotatable movement with the stem, a part of the spindle being of a polysided cross-shaped configuration and projecting through a wall of similar cross-section forming an aperture in an intermediate member, an external axially extending screw threaded surface on the intermediate member forming an aperture operably engaged with a correspondingly screw threaded surface on the interior of an open ended cavity in the end of the stem, and the spindle being provided with stop means at either end of said part to limit the permissible relative axial movement of the spindle and the intermediate part.

16. A reversible valve actuator as defined by claim 1 being further comprised of a fluid flow control valve and wherein the stem of the actuator is coupled to the moving parts of the valve and the supporting structure is mounted on the valve body.

References Cited by the Examiner

UNITED STATES PATENTS 2,815,037  12/1957  Starrett _____ 137—271

FOREIGN PATENTS 326,676  2/1958  Switzerland.

MARTIN P. SCHWADRON, *Acting Primary Examiner.*